United States Patent
Sugimura

(10) Patent No.: US 9,378,896 B2
(45) Date of Patent: Jun. 28, 2016

(54) SOLID ELECTROLYTIC CAPACITOR AND METHOD FOR MANUFACTURING THE SAME

(71) Applicant: ROHM CO., LTD., Kyoto-shi, Kyoto (JP)

(72) Inventor: Naotsugu Sugimura, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 270 days.

(21) Appl. No.: 14/075,335

(22) Filed: Nov. 8, 2013

(65) Prior Publication Data

US 2014/0126114 A1    May 8, 2014

(30) Foreign Application Priority Data

Nov. 8, 2012  (JP) ................ 2012-245942
Sep. 30, 2013 (JP) ................ 2013-204338

(51) Int. Cl.
*H01G 9/042*    (2006.01)
*H01G 9/00*     (2006.01)
*H01G 9/025*    (2006.01)
*H01G 9/15*     (2006.01)

(52) U.S. Cl.
CPC ............. *H01G 9/0036* (2013.01); *H01G 9/025* (2013.01); *H01G 9/0425* (2013.01); *H01G 9/15* (2013.01); *Y10T 29/417* (2015.01)

(58) Field of Classification Search
USPC ......... 361/516–519, 523, 525, 528, 529, 530, 361/532, 540
See application file for complete search history.

(56) References Cited

U.S. PATENT DOCUMENTS 7,411,779 B2 *  8/2008  Merker ............... H01G 9/0036
                                                    29/25.01
8,810,997 B2 *  8/2014  Yamaguchi ............ H01G 9/028
                                                    361/523

FOREIGN PATENT DOCUMENTS

JP    2008-311582    12/2008

* cited by examiner

*Primary Examiner* — Nguyen T Ha
(74) *Attorney, Agent, or Firm* — Hamre, Schumann, Mueller & Larson, P.C.

(57) ABSTRACT

A solid electrolytic capacitor includes a porous sintered body made of a valve metal, a dielectric layer on the porous sintered body, a solid electrolyte layer on the dielectric layer, and a cathode layer on the solid electrolyte layer. The solid electrolyte layer includes an inner electrode layer covering the dielectric layer inside the porous sintered body and an outer electrode layer covering the inner electrode layer outside the porous sintered body. The outer electrode layer includes a solid particle containing layer formed by applying a dispersion material liquid containing a conductive polymer dispersion material, solid particles and a solvent to the inner electrode layer and then removing the solvent.

28 Claims, 9 Drawing Sheets

SOLID ELECTROLYTIC CAPACITOR AND METHOD FOR MANUFACTURING THE SAME

BACKGROUND OF THE INVENTION

1. Field of the Invention

The present invention relates to a solid electrolytic capacitor and a method for making a solid electrolytic capacitor.

2. Description of the Related Art

A typical solid electrolytic capacitor includes a porous sintered body that actions as an anode, and a dielectric layer, a solid electrolyte layer and a cathode layer which are formed on the porous sintered body. A technique for manufacturing a solid electrolyte layer is disclosed in e.g. JP-A-2008-311582. According to this technique, a solid electrolyte layer is provided by separately forming an inner electrode layer to be positioned inside the porous sintered body and an outer electrode layer to be positioned outside the porous sintered body. In this technique, after the dielectric layer and the inner electrode layer are formed, the outer electrode layer is formed by applying a dispersion material liquid, which contains a conductive polymer dispersion material and a solvent, to the porous sintered body and then removing the solvent. According to this technique, it is not necessary to infiltrate the dispersion material liquid into the small holes in the porous sintered body. This is advantageous in that, as the conductive polymer dispersion material, a material suitable for reducing the ESR (Equivalent Series Resistance) of a solid electrolytic capacitor can be selected without limitation.

However, the surface of the outer electrode layer formed by the above-described technique tends to be smooth, as compared with e.g. the surface of a solid electrolyte layer formed by chemical polymerization. Thus, cracking may occur between the solid electrolyte layer and the cathode layer. Further, since the outer electrode layer and the cathode layer are made of considerably different materials, a large contact resistance may be generated at the contact surfaces. This may leads to a high ESR of the solid electrolytic capacitor.

SUMMARY OF THE INVENTION

The present invention has been conceived under the circumstances described above. It is therefore an object of the present invention to provide a solid electrolytic capacitor which has a relatively low ESR and a method for manufacturing such a solid electrolytic capacitor.

According to a first aspect of the present invention, there is provided a solid electrolytic capacitor provided with: a porous sintered body made of a valve metal; a dielectric layer formed on the porous sintered body; a solid electrolyte layer formed on the dielectric layer; and a cathode layer formed on the solid electrolyte layer. The solid electrolyte layer includes an inner electrode layer and an outer electrode layer, where the inner electrode layer covers the dielectric layer inside the porous sintered body, and the outer electrode layer covers the inner electrode layer outside the porous sintered body. The outer electrode layer is provided with a solid particle containing layer including a conductive polymer dispersion material and solid particles, where the solid particle containing layer is formed by applying a dispersion material liquid containing the conductive polymer dispersion material, the solid particles and a solvent to the inner electrode layer, and then removing the solvent.

Preferably, the cathode layer includes: a base layer covering the solid electrolyte layer; and an upper layer on the base layer.

Preferably, the solid particles and the base layer are made of a same material.

Preferably, the solid particles are made of graphite.

Preferably, the solid particles are flat.

Preferably, the ratio of length and thickness of the solid particles is in a range of from 1:0.05 to 1:0.3.

Preferably, the concentration of the solid particles with respect to the conductive polymer dispersion material is 5 to 70 wt %.

Preferably, the concentration of the solid particles with respect to the conductive polymer dispersion material is 20 to 60 wt %.

Preferably, the solid particles are made of a metal.

Preferably, the metal is Ta or stainless steel.

Preferably, the solid particles are made of a metal oxide.

Preferably, the metal oxide is tin oxide or perovskite type oxide.

Preferably, the solid particle containing layer has an irregular surface.

Preferably, the solid particles are present in projections of the irregular surface of the solid particle containing layer.

Preferably, the solid particle containing layer is in contact with the cathode layer.

Preferably, the solid particle containing layer is in contact with the inner electrode layer.

Preferably, the outer electrode layer consists solely of the solid particle containing layer.

According to a second aspect of the present invention, there is provided a method for manufacturing a solid electrolytic capacitor, and the method includes the steps of: forming a porous sintered body from a valve metal; forming a dielectric layer on the porous sintered body; forming a solid electrolyte layer on the dielectric layer; and forming a cathode layer on the solid electrolyte layer. The step of forming the solid electrolytic layer includes forming an inner electrode layer to cover the dielectric layer inside the porous sintered body and forming an outer electrode layer to cover the inner electrode layer outside the porous sintered body. The step of forming the outer electrode layer includes forming a solid particle containing layer by applying a dispersion material liquid containing a conductive polymer dispersion material, solid particles and a solvent to the inner electrode layer, and then removing the solvent.

Preferably, the step of forming the cathode layer includes forming a base layer to cover the solid electrolyte layer and then forming an upper layer on the base layer.

Preferably, the solid particles and the base layer are made of a same material.

Preferably, the solid particles are made of graphite.

Preferably, the solid particles are flat.

Preferably, the ratio of length and thickness of the solid particles is in a range of from 1:0.05 to 1:0.3.

Preferably, the concentration of the solid particles with respect to the conductive polymer dispersion material is 5 to 70 wt %.

Preferably, the concentration of the solid particles with respect to the conductive polymer dispersion material is 20 to 60 wt %.

Preferably, the solid particles are made of a metal.

Preferably, the metal is Ta or stainless steel.

Preferably, the solid particles are made of a metal oxide.

Preferably, the metal oxide is tin oxide or perovskite type oxide.

Preferably, in the step of forming the outer electrode layer, the step of forming the solid particle containing layer is performed last.

Preferably, in the step of forming the outer electrode layer, the step of forming the solid particle containing layer is performed first.

Preferably, the step of forming the outer electrode layer consists solely of the step of forming a solid particle containing layer.

Other features and advantages of the present invention will become more apparent from detailed description given below with reference to the accompanying drawings.

DESCRIPTION OF THE PREFERRED EMBODIMENTS

Preferred embodiments of the present invention are described below with reference to the accompanying drawings.

Figure 1:
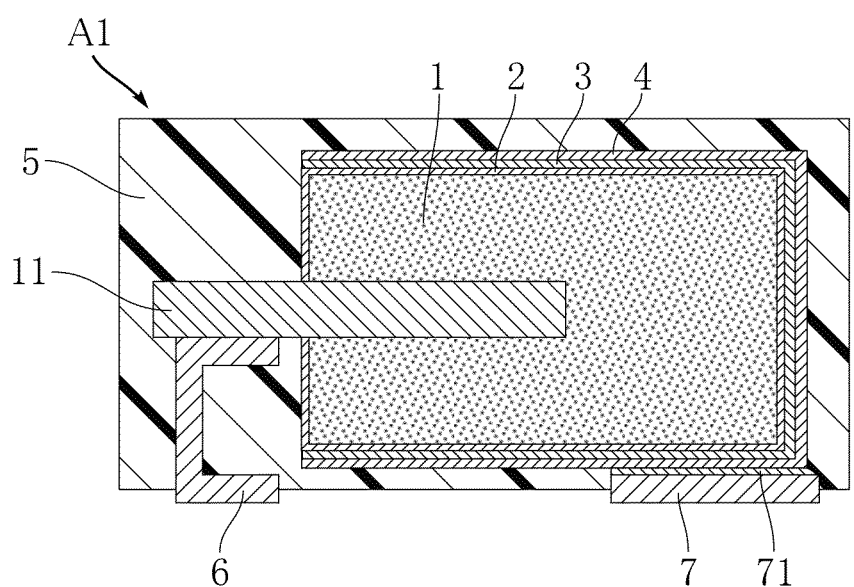
FIG. 1 is a schematic sectional view of a solid electrolytic capacitor according to a first embodiment of the present invention.
Figure 2:
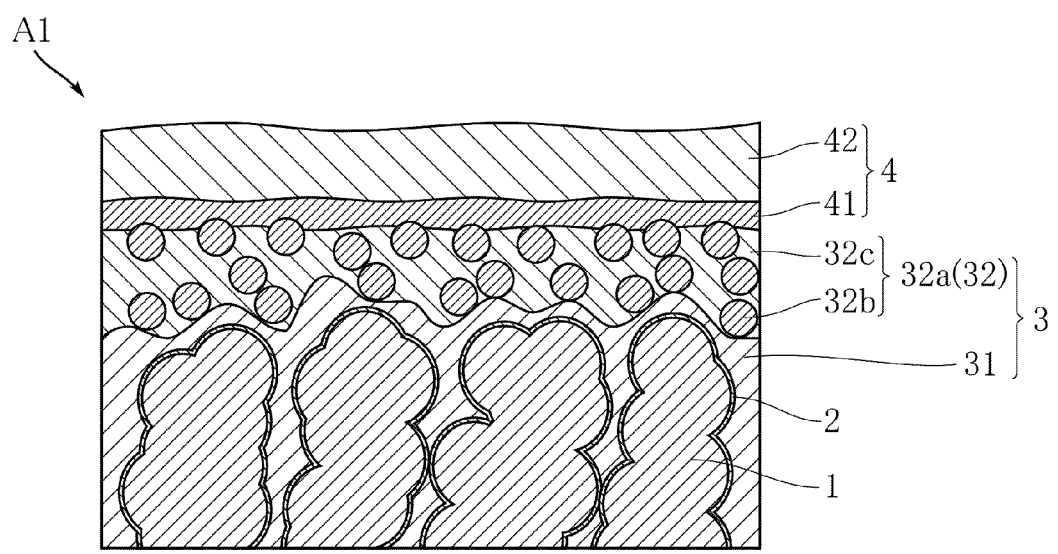
FIG. 2 is an enlarged sectional view schematically showing a part of the solid electrolytic capacitor of FIG. 1.

FIGS. 1 and 2 show a solid electrolytic capacitor according to a first embodiment of the present invention. The solid electrolytic capacitor A1 of this embodiment includes a porous sintered body 1, an anode wire 11, a dielectric layer 2, a solid electrolyte layer 3, a cathode layer 4, a resin package 5, an anode external terminal 6 and a cathode external terminal 7.

The porous sintered body 1 acts as anode with respect to the dielectric layer 2 and is made of a valve metal such as tantalum or niobium. For instance, the porous sintered body 1 is in the form of a rectangular parallelepiped. A part of the anode wire 11 is embedded in the porous sintered body 1. The anode wire 11 is made of a valve metal such as tantalum or niobium. The porous sintered body 1 has a number of minute holes in it.

The dielectric layer 2 is formed on the surfaces of the porous sintered body 1. Specifically, the dielectric layer 2 covers not only the outer surface of the porous sintered body 1 but also the inner surfaces of the minute holes formed in the porous sintered body 1. The dielectric layer 2 is typically made of an oxide of a valve metal such as tantalum pentoxide or niobium pentoxide.

The solid electrolyte layer 3 covers the dielectric layer 2. As shown in FIG. 2, the solid electrolyte layer 3 is made up of an inner electrode layer 31 and an outer electrode layer 32. The inner electrode layer 31 covers the portions of the dielectric layer 2 which covers the inner surfaces of the minute holes in the porous sintered body 1, thereby filling the minute holes. The inner electrode layer 31 is made of e.g. manganese dioxide or conductive polymer.

The outer electrode layer 32 is on the inner electrode layer 31 and covers the inner electrode layer 31 outside the porous sintered body 1. In this embodiment, the outer electrode layer 32 consists solely of a solid particle containing layer 32a. The solid particle containing layer 32a contains solid particles 32b and conductive polymer 32c. The solid particles 32b are dispersed in the solid particle containing layer 32a. The surface of the solid particle containing layer 32a is irregular due to the existence of the solid particles 32b. To realize the irregular surface, it is preferable that the average particle size of the solid particles 32b is not more than 5 µm when the solid particle containing layer 32a is about 2-30 µm in thickness. In this embodiment, graphite particles are used as the solid particles 32b. However, graphite is merely an example of the material for the solid particles 32b, and other conductive materials that can take the form of particles can be employed. For example, particles of a metal such as Ta or stainless steel or a metal oxide such as tin oxide or perovskite type oxide may be employed.

The cathode layer 4 is formed on the outer electrode layer 32 of the solid electrolyte layer 3 and is made up of a base layer 41 and an upper layer 42. For instance, the base layer 41 is made of graphite. In this embodiment, the solid particle containing layer 32a forming the outer electrode layer 32 of the solid electrolyte layer 3 and the base layer 41 of the cathode layer 4 are in direct contact with each other. The solid particles 32b of the solid particle containing layer 32a and the base layer 41 of the cathode layer 4 are made of the same material, i.e., graphite. The base layer 41 is formed on the irregular surface of the solid particle containing layer 32a. The upper layer 42 is formed on the base layer 41 and made of e.g. silver.

The resin package 5 covers the porous sintered body 1, the anode wire 11, the dielectric layer 2, the solid electrolyte layer 3 and the cathode layer 4. For instance, the resin package 5 is made of an epoxy resin.

The anode external terminal 6 is bonded to the anode wire 11. Part of the anode external terminal 6 is on the outside of the resin package 5. For instance, the anode external terminal 6 is made of an Ni—Fe alloy, such as "42 alloy", plated with copper. The portion of the anode external terminal 6 which is on the outside of the resin package 5 is utilized as a mounting terminal when the solid electrolytic capacitor A1 is surface-mounted.

The cathode external terminal 7 is bonded to the cathode layer 4 via a conductive bonding material 71 made of e.g. silver. Part of the cathode external terminal 7 is on the outside of the resin package 5. For instance, the cathode external terminal 7 is made of an Ni—Fe alloy, such as "42 alloy", plated with copper. The portion of the cathode external terminal 7 which is on the outside of the resin package 5 is utilized as a mounting terminal when the solid electrolytic capacitor A1 is surface-mounted.

A method for manufacturing the solid electrolytic capacitor A1 is described below.

Figure 3:
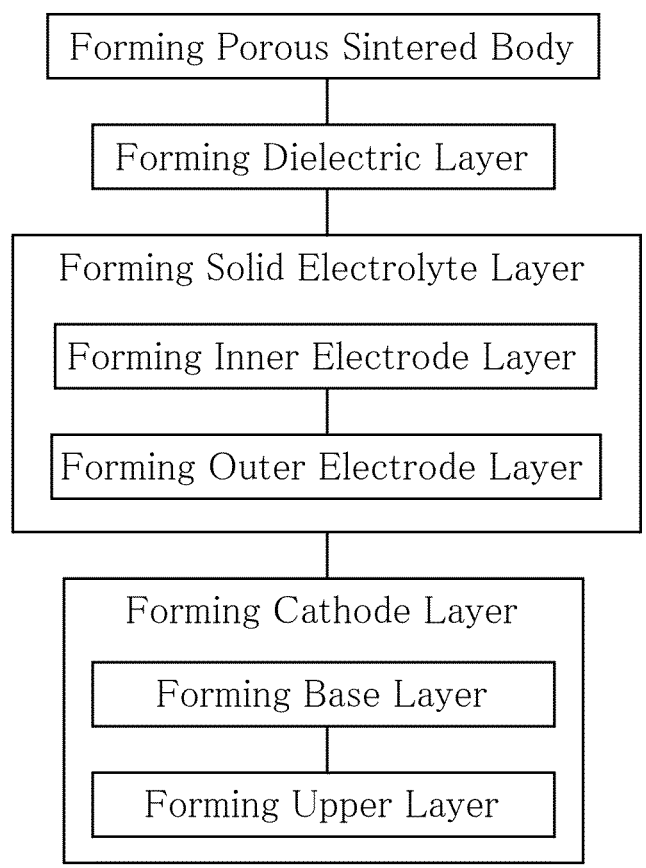
FIG. 3 is a flowchart of a method for manufacturing a solid electrolytic capacitor according to a first embodiment of the present invention.
Figure 4:
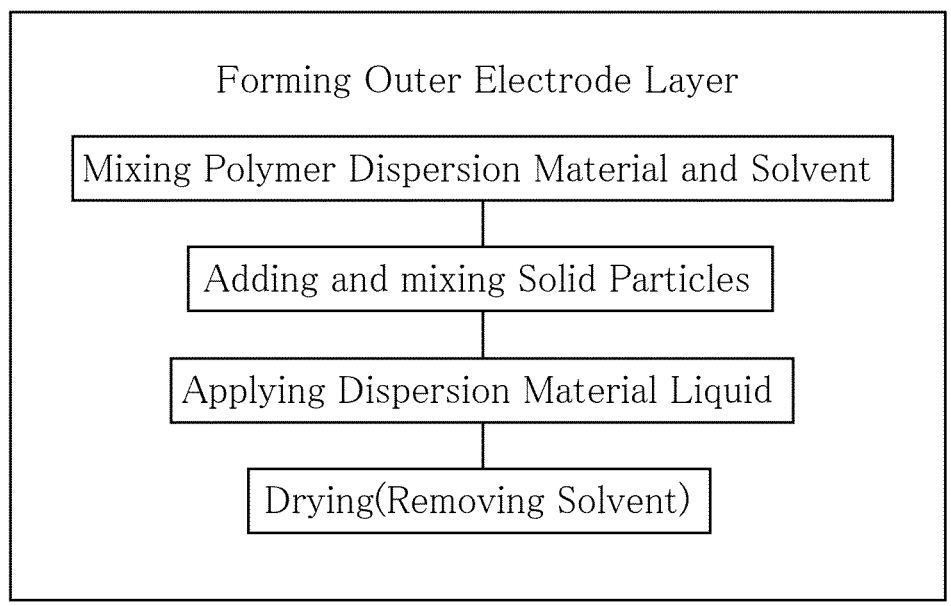
FIG. 4 is a flowchart of a process for forming an outer electrode layer of a solid electrolytic capacitor shown in FIG. 3.

FIGS. 3 and 4 show flowcharts of a method for manufacturing the solid electrolytic capacitor A1. First, a porous sintered body 1 is formed. In this step, fine powder of a valve metal such as tantalum or niobium is prepared. Then, the fine powder and a wire member which is to become the anode wire 11 are held in a mold, and pressure molding is performed. Thus, a porous body in which the wire member is partially embedded is obtained. Then, the porous body and the wire member are sintered. By this sintering process, the powder particles of the valve metal are fused together, whereby the porous sintered body 1 having a number of minute holes is obtained.

Then, the dielectric layer 2 is formed. Specifically, for instance, while holding the wire member, the porous sintered body 1 is immersed in an aqueous solution of phosphoric as a chemical conversion liquid, and anodizing process is performed. In this way, the dielectric layer 2 of tantalum pentoxide or niobium pentoxide is formed on the outer surface of the porous sintered body 1 and the inner surfaces of the holes of the porous sintered body 1.

Then, the solid electrolyte layer 3 is formed. First, in the step of forming the solid electrolyte layer 3, the inner electrode layer 31 is formed. Specifically, for instance, the porous sintered body 1 is immersed in an aqueous solution of a known oxidizing agent and then pulled out of the solution. Then, the porous sintered body 1 is immersed in an aqueous solution of a known monomer and then pulled out and dried. By this, chemical polymerization occurs. Then, a cleaning and re-forming process is performed, if necessary. Thus, the inner electrode layer 31 made of conductive polymer is obtained. Alternatively, the inner electrode layer 31 may be formed by electrolytic polymerization. In this case, an electrolytic solution containing a monomer and a dopant is applied to the porous sintered body 1 and then a current is applied, whereby the inner electrode layer 31 made of a conductive polymer is formed. Alternatively, the porous sintered body 1 may be immersed in an aqueous solution of manganese nitrate and then pulled out of the aqueous solution. Then, the porous sintered body 1, with the aqueous solution of manganese nitrate adhering to it, may be sintered. According to this process, the inner electrode layer 31 made of manganese dioxide is obtained.

Then, the outer electrode layer 32 is formed. First, in this process, a polymer dispersion material and a solvent are mixed. The polymer dispersion material is conductive polymer particles. As the conductive polymer, in view of the electrical conductivity, use may be made of a polymer or a copolymer of one or two species selected from polypyrrole, polythiophene, poly(N-methylpyrrole), poly(3-methyl thiophene), poly(3-methoxythiophene) and poly(3,4-ethylenedioxythiophene). To enhance electrical conductivity and thermal resistance, polypyrrole and poly(3,4-ethylenedioxythiophene) are preferable. As the solvent, use is made of one that can uniformly disperse the polymer dispersion material. For instance, water, ethanol or an organic solvent may be used. After the mixture of the polymer dispersion material and the solvent is prepared in this way, solid particles 32b are added into the mixture and stirred. In this embodiment, graphite particles are used as the solid particles 32b. However, graphite is merely an example of the material for the solid particles 32b, and other conductive materials that can take the form of particles can be employed. For example, particles of a metal such as Ta or stainless steel or a metal oxide such as tin oxide or perovskite type oxide may be employed. In this embodiment, the average particle size of the solid particles 32b is not more than 5 μm. The concentration of the solid particles 32b is 5-70 wt %, and more preferably 20-60 wt % with respect to the polymer dispersion material. In this way, the dispersion material liquid containing the solid particles 32b is obtained.

Then, the dispersion material liquid is applied to the inner electrode layer 31 on the porous sintered body 1. The application of the dispersion material liquid to inner electrode layer 31 may be performed by dipping the porous sintered body 1 into the dispersion material liquid, spraying the dispersion material liquid to the porous sintered body 1 or other suitable techniques. Then, the solvent is removed by e.g. drying the applied dispersion material liquid. Thus, the solid particle containing layer 32a containing the conductive polymer 32c and the solid particles 32b dispersed in the layer is obtained. In this embodiment, the solid particle containing layer 32a provides the outer electrode layer 32.

Then, the cathode layer 4 is formed. Specifically, first, the base layer 41 is formed. For instance, the base layer 41 is formed by immersing the porous sintered body 1 into a solution of graphite and an organic solvent, followed by pulling out and drying or baking the porous sintered body 1. Then, the upper layer 42 is formed. Specifically, the upper layer 42 is formed by immersing the porous sintered body 1 into a solution of Ag filler and an organic solvent, followed by pulling out and drying or baking the porous sintered body 1. In this way, the cathode layer 4 is obtained.

Thereafter, bonding of the anode external terminal 6 and bonding of the cathode external terminal 7 using the conductive bonding material 71 are performed. Then, the resin package 5 is formed by e.g. molding. By the above-described process, the solid electrolytic capacitor A1 shown in FIGS. 1 and 2 is obtained.

The advantages of the solid electrolytic capacitor A1 and the manufacturing method are described below.

According to this embodiment, the surface of the solid particle containing layer 32a is irregular due to the existence of solid particles 32b in it. Thus, the material of the cathode layer 4 enters the dents of the irregular surface of the outer electrode layer 32 of the solid electrolyte layer 3. This provides so-called anchor effect, so that formation of a crack between the solid electrolyte layer 3 and the cathode layer 4 is prevented. Further, since the surface of the solid particle containing layer 32a is irregular, the interface between the solid electrolyte layer 3 and the cathode layer 4, where contact resistance is generated, has an increased area. This leads to a reduction in ESR of the solid electrolytic capacitor A1.

The solid particle containing layer 32a and the base layer 41 of the cathode layer 4 are in direct contact with each other. Both of the solid particles 32b and the base layer 41 are made of graphite. Thus, the base layer 41 is bonded to the solid particle containing layer 32a with good affinity, which leads to enhanced bonding strength of the solid electrolyte layer 3 and the cathode layer 4.

Since the outer electrode layer 32 consists solely of the solid particle containing layer 32a, the outer electrode layer 32 is formed by a relatively simple step in manufacturing the solid electrolytic capacitor A1. Thus, the solid electrolytic capacitor A1 is manufactured efficiently.

FIGS. 5-10 show other embodiments of the present invention. In these figures, the elements that are identical or similar to those of the foregoing embodiment are designated by the same reference signs as those used for the foregoing embodiment.

Figure 5:
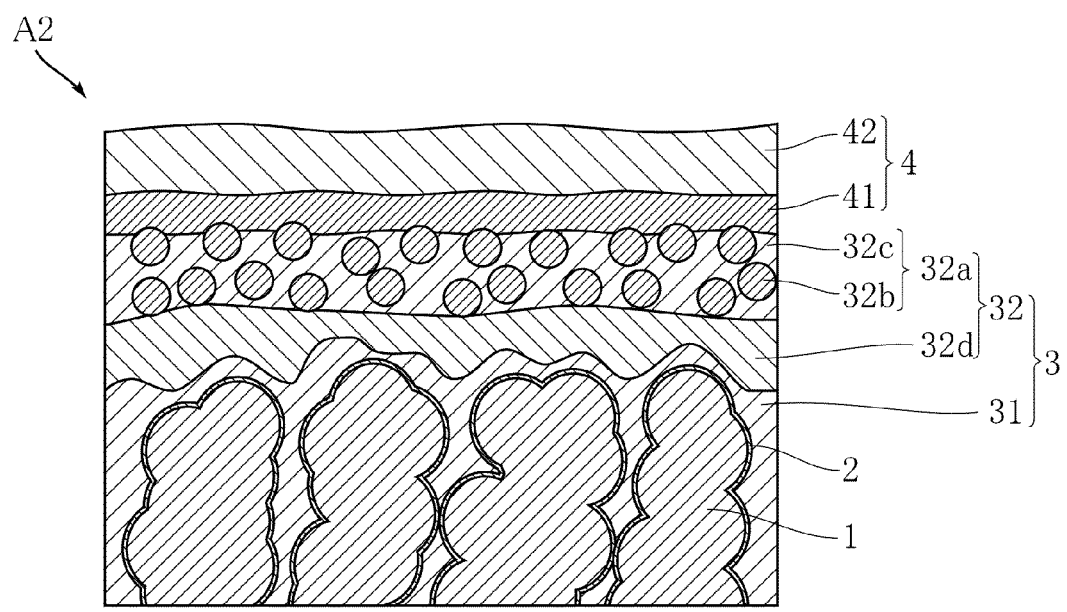
FIG. 5 is an enlarged sectional view schematically showing a part of a solid electrolytic capacitor according to a second embodiment of the present invention.

FIG. 5 shows a solid electrolytic capacitor according to a second embodiment of the present invention. The solid electrolytic capacitor A2 of this embodiment differs from that of the foregoing embodiment in that the outer electrode layer 32 is made up of a solid particle containing layer 32 and a conductive polymer layer 32d. The conductive polymer layer 32d is positioned between the inner electrode layer 31 and the solid particle containing layer 32a and covers the inner electrode layer 31 outside the porous sintered body 1. For instance, the conductive polymer layer 32d may be formed by using the same mixture of a polymer dispersion material and a solvent as that used to form the outer electrode layer 32 of the first embodiment. Specifically, the conductive polymer layer 32d may be formed by applying this mixture to the inner electrode layer 31 on the porous sintered body 1, without adding solid particles 32b to it, and then removing the solvent.

According to this embodiment again, the ESR of the solid electrolytic capacitor A2 reduces.

Unlike the above-described arrangement, the conductive polymer layer 32d may be positioned between the solid particle containing layer 32a and the cathode layer 4. In this case, the solid particles 32b are not indirect contact with the base layer 41. However, since the conductive polymer layer 32d is formed on the irregular surface of the solid particle containing layer 32a, the surface of the conductive polymer layer 32d is expected to become irregular. Thus, the solid electrolyte layer 3 and the cathode layer 4 are reliably bonded.

Figure 6:
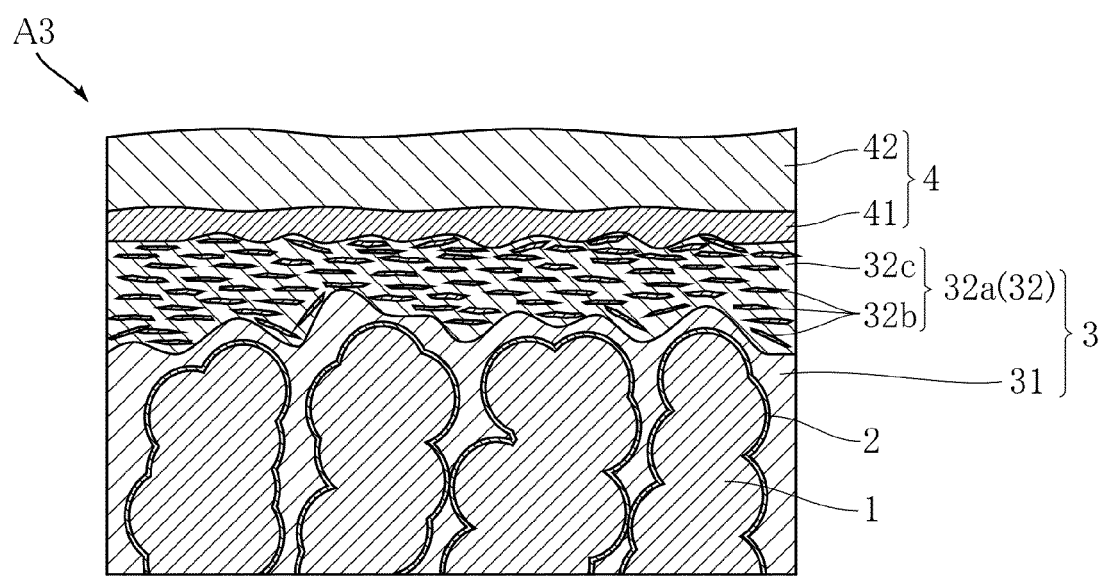
FIG. 6 is an enlarged sectional view schematically showing a part of a solid electrolytic capacitor according to a third embodiment of the present invention.
Figure 7:
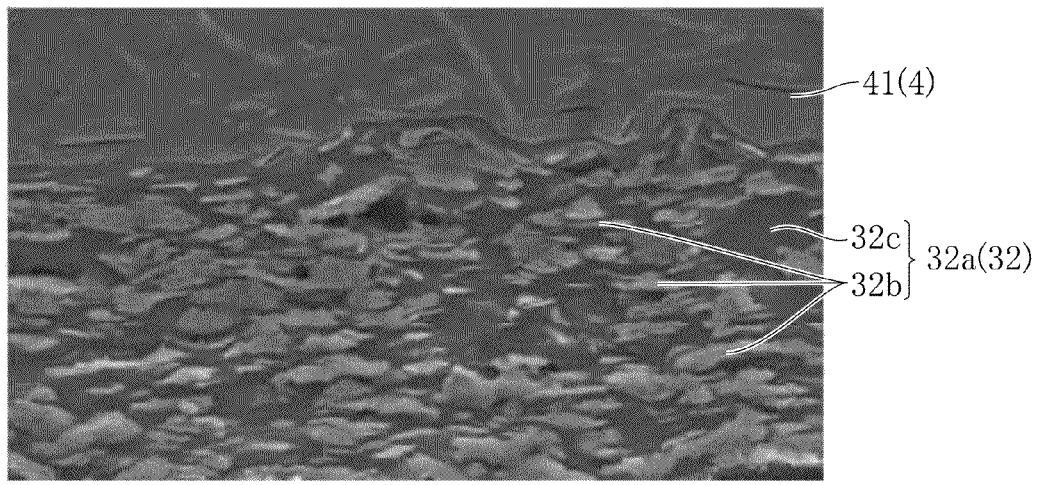
FIG. 7 is an enlarged photograph of a section of the solid electrolytic capacitor shown in FIG. 6.
Figure 8:
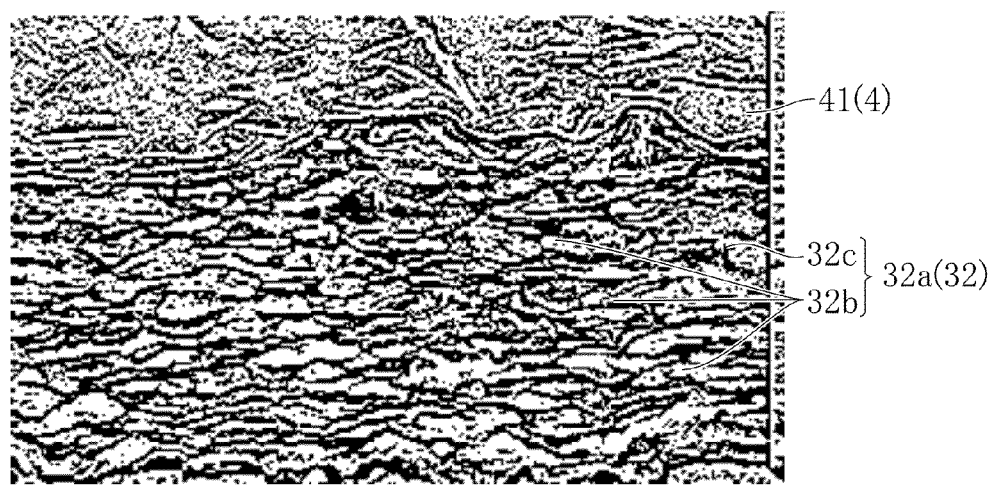
FIG. 8 is an enlarged sectional view the solid electrolytic capacitor shown in FIG. 6.

FIGS. 6-8 show a solid electrolytic capacitor according to a third embodiment of the present invention. The solid electrolytic capacitor A3 of this embodiment has the same structure as that of the solid electrolytic capacitor A1 except the shape of the solid particles 32b. FIG. 6 is a schematic sectional view of the solid electrolytic capacitor A3. FIG. 7 is an enlarged photograph of a section of the solid electrolytic capacitor A3. FIG. 8 is a sectional view obtained by performing edge detection with respect to the photograph of FIG. 7.

In this embodiment, the solid particles 32b are flat graphite particles. Typically, the ratio of length and thickness of the solid particles 32b is in the range of from 1:0.05 to 1:0.5. As shown in FIGS. 6-8, most of the solid particles 32b are arranged so that their thickness directions correspond to the vertical direction in the figure and their longitudinal directions correspond to the horizontal direction in the figure.

The surface of the solid particle containing layer 32a is irregular due to the existence of the solid particles 32b. To realize the irregular surface, it is preferable that the average particle size of the solid particles 32b is not more than 5 μm when the solid particle containing layer 32a is about 2-30 μm in thickness. As to the solid particles 32b which are flat, the average particle size refers to the length. As better shown in FIG. 6, at least some of the solid particles 32b are in the projections of the irregular surface of the solid particle containing layer 32a.

In manufacturing the solid electrolytic capacitor A3, the solid particles 32b are contained at a concentration of 5-70 wt %, and more preferably 20-60 wt % with respect to the above-described polymer dispersion material. Thus, in the solid electrolytic capacitor A3, the concentration of the solid particles 32B is 5-70 wt %, and more preferably 20-60 wt % with respect to the conductive polymer 32c.

Figure 9:
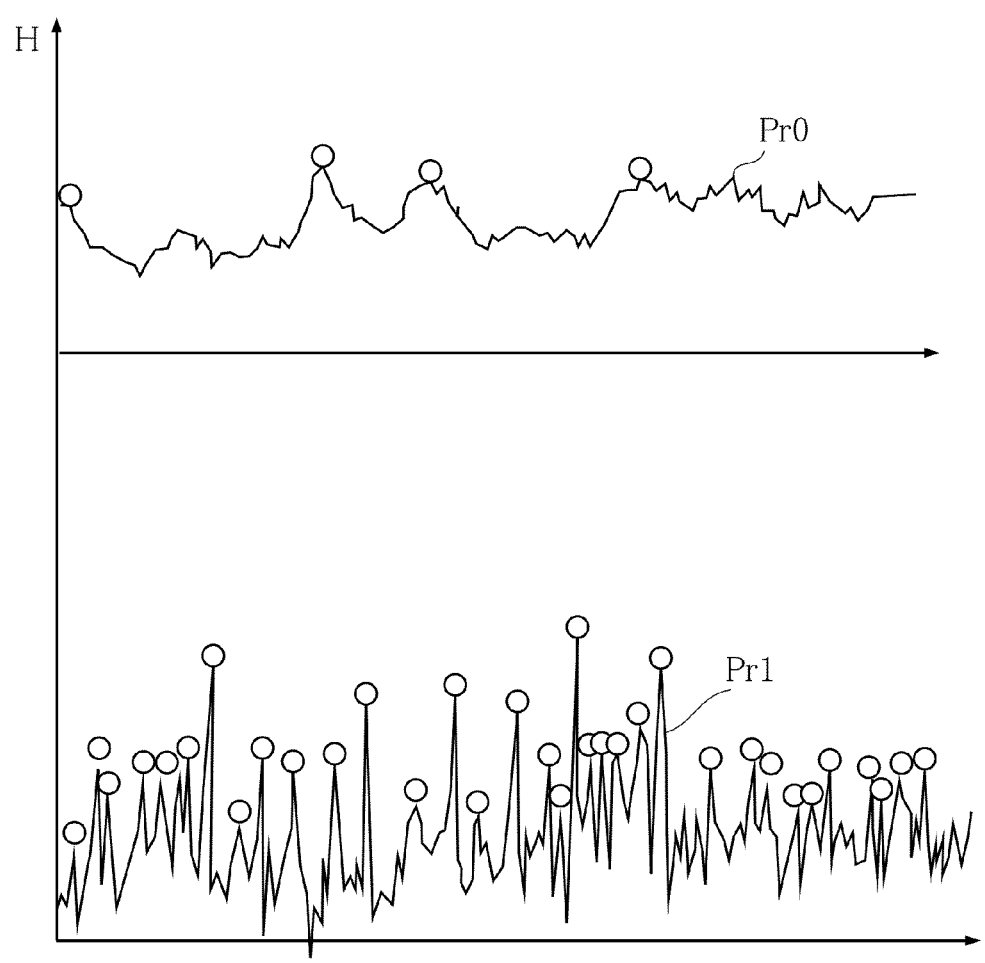
FIG. 9 is a graph showing the measurement results of the surface shape of a solid particle containing layer of the solid electrolytic capacitor shown in FIG. 6.

The surface shape of the solid particle containing layer 32a was measured. The results are shown in FIG. 9. The horizontal axis of the figure corresponds to a direction within a plane in which the surface of the solid particle containing layer 32a spreads. The vertical axis of the figure shows the height H of each portion of the surface of the solid particle containing layer 32a. The profile Pr1 is the measurement results of the surface shape of the solid particle containing layer 32a (outer electrode layer 32) of the solid electrolytic capacitor A3. The profile Pr0 is the measurement results of the surface shape of the outer electrode layer, which does not contain solid particles, of a conventional solid electrolytic capacitor as a comparative example. The measurement was performed by capturing the image by applying laser slit beam and analyzing the image to obtain the height H.

As will be understood from the comparison of the profile Pr1 with profile Pr0, the solid particle containing layer 32a (outer electrode surface 32) of the solid electrolytic capacitor A3, which contains solid particles 32b, has a larger number of remarkable height differences in a given area than the surface of the outer electrode layer of the comparative example which does not contain solid particles. The points to which white circles are applied in the graph are the projections having a height H exceeding about 2 μm. In the profile Pr0, the number of these projections (number of white circles) is four within a given length area along the horizontal axis. In the profile Pr1, the number of these projections (number of white circles) in the given length area is 34.

Figure 10:
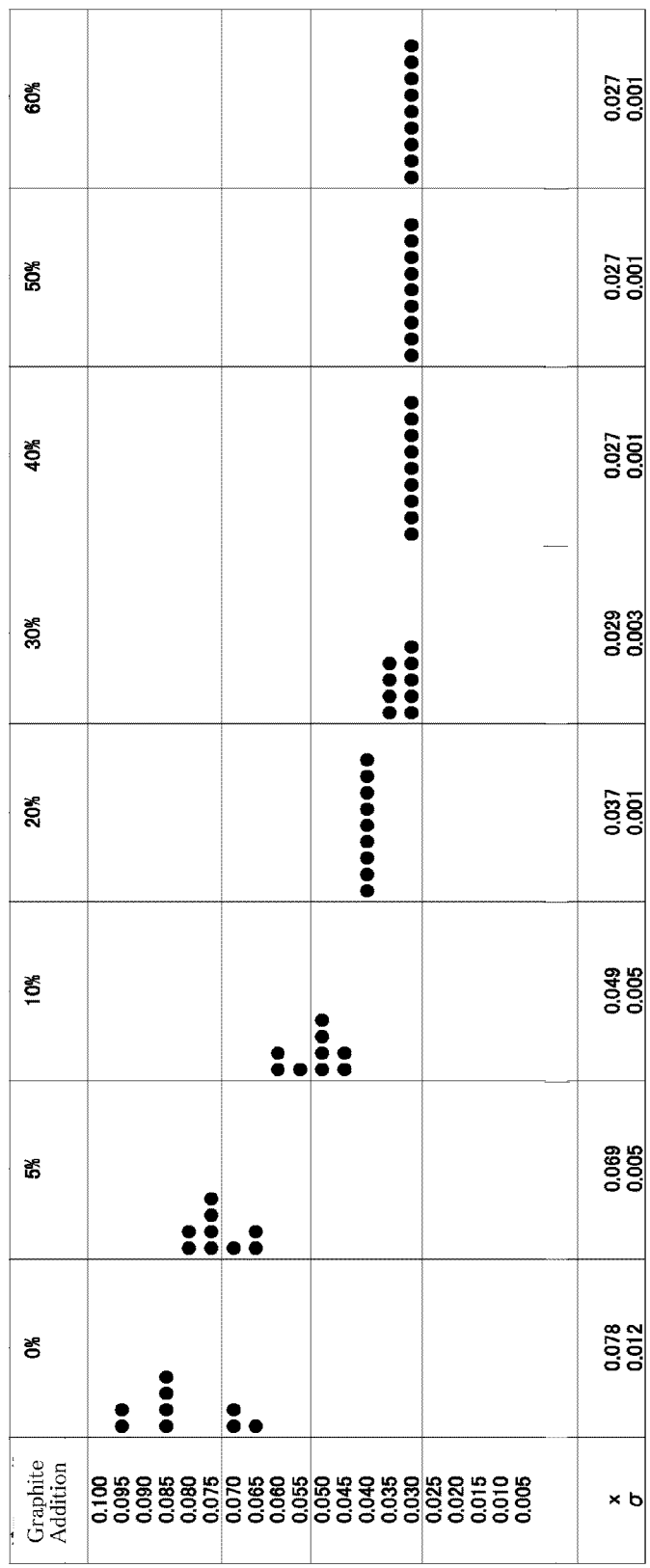
FIG. 10 is a table showing the measurement results of the ESR of the solid electrolytic capacitor shown in FIG. 6.

The ESRs of a plurality of solid electrolytic capacitors as the samples of the solid electrolytic capacitor A3 were measured. The measurement results are shown in FIG. 10. The values on the top row in the figure indicate concentrations (wt %) of the solid particles 32b with respect to the conductive polymer 32c. The values in the leftmost column in the figure are the ESRs in the unit mΩ. The values in the row with an "x" indicate the average of the ESRs of a plurality of samples. The values in the row with "σ" indicate standard deviations.

Each of the black dots in the figure indicates the measurement result of each of the samples.

As will be understood from the figure, variations in the ESR among a plurality of samples considerably reduces when the concentration of the solid particles 32b is 5 wt % or higher. Such variations in the ESR further reduces when the concentration of the solid particles 32b is 20 wt % or higher. Further, when the concentration of the solid particles 32b is 20 wt % or higher, the average of the ESRs of a plurality of samples having the same solid particle concentration reliably drops below 0.04 mΩ, as is 0.037 mΩ when the concentration is 20%. When the concentration of the solid particles 32b is further increased, the average of the ESRs drops to e.g. 0.027 mΩ. However, the study by the inventors has revealed that when the concentration of the solid particles 32b is too high, cracking easily occurs in the solid particle containing layer 32a. The study also revealed that to prevent cracking, the concentration of the solid particles 32b needs to be 70 wt % or lower, and cracking is more reliably prevented when the concentration is 60 wt % or lower.

The solid electrolytic capacitor and the manufacturing method according to the present invention are not limited to the foregoing embodiments. The specific arrangement of the solid electrolytic capacitor and manufacturing method according to the present invention can be varied in design in many ways.

The invention claimed is:

1. A solid electrolytic capacitor comprising:
   a porous sintered body made of a valve metal;
   a dielectric layer formed on the porous sintered body;
   a solid electrolyte layer formed on the dielectric layer; and
   a cathode layer formed on the solid electrolyte layer;
   wherein the solid electrolyte layer includes an inner electrode layer and an outer electrode layer, the inner electrode layer covering the dielectric layer inside the porous sintered body, the outer electrode layer covering the inner electrode layer outside the porous sintered body,
   the outer electrode layer comprises a solid particle containing layer including a conductive polymer dispersion material and solid particles, the solid particle containing layer being formed by applying a dispersion material liquid containing the conductive polymer dispersion material, the solid particles and a solvent to the inner electrode layer and then removing the solvent, and a ratio of length to thickness of each of the solid particles is 1:X, where 0.05≤X≤0.3.

2. The solid electrolytic capacitor according to claim 1, wherein the cathode layer comprises: a base layer covering the solid electrolyte layer; and an upper layer on the base layer.

3. The solid electrolytic capacitor according to claim 2, wherein the solid particles and the base layer are made of a same material.

4. The solid electrolytic capacitor according to claim 1, wherein the solid particles are made of graphite.

5. The solid electrolytic capacitor according to claim 1, wherein a concentration of the solid particles with respect to the conductive polymer dispersion material is 5 to 70 wt %.

6. The solid electrolytic capacitor according to claim 1, wherein a concentration of the solid particles with respect to the conductive polymer dispersion material is 20 to 60 wt %.

7. The solid electrolytic capacitor according to claim 1, wherein the solid particles are made of a metal.

8. The solid electrolytic capacitor according to claim 7, wherein the metal is Ta or stainless steel.

9. The solid electrolytic capacitor according to claim 1, wherein the solid particles are made of a metal oxide.

10. The solid electrolytic capacitor according to claim 9, wherein the metal oxide is tin oxide or perovskite type oxide.

11. The solid electrolytic capacitor according to claim 1, wherein the solid particle containing layer has an irregular surface.

12. The solid electrolytic capacitor according to claim 11, wherein the solid particles are present in projections of the irregular surface of the solid particle containing layer.

13. The solid electrolytic capacitor according to claim 1, wherein the solid particle containing layer is in contact with the cathode layer.

14. The solid electrolytic capacitor according to claim 1, wherein the solid particle containing layer is in contact with the inner electrode layer.

15. The solid electrolytic capacitor according to claim 1, wherein the outer electrode layer consists solely of the solid particle containing layer.

16. A method for manufacturing a solid electrolytic capacitor, the method comprising the steps of:
   forming a porous sintered body from a valve metal;
   forming a dielectric layer on the porous sintered body;
   forming a solid electrolyte layer on the dielectric layer; and
   forming a cathode layer on the solid electrolyte layer;
   wherein the step of forming the solid electrolytic layer comprises forming an inner electrode layer to cover the dielectric layer inside the porous sintered body and forming an outer electrode layer to cover the inner electrode layer outside the porous sintered body,
   the step of forming the outer electrode layer comprises forming a solid particle containing layer by applying a dispersion material liquid containing a conductive polymer dispersion material, solid particles and a solvent to the inner electrode layer and then removing the solvent, and
   a ratio of length to thickness of each of the solid particles is 1:X, where 0.05≤X≤0.3.

17. The method for manufacturing a solid electrolytic capacitor according to claim 16, wherein the step of forming the cathode layer comprises forming a base layer to cover the solid electrolyte layer and then forming an upper layer on the base layer.

18. The method for manufacturing a solid electrolytic capacitor according to claim 17, wherein the solid particles and the base layer are made of a same material.

19. The method for manufacturing a solid electrolytic capacitor according to claim 16, wherein the solid particles are made of graphite.

20. The method for manufacturing a solid electrolytic capacitor according to claim 19, wherein a concentration of the solid particles with respect to the conductive polymer dispersion material is 5 to 70 wt %.

21. The method for manufacturing a solid electrolytic capacitor according to claim 20, wherein the metal is Ta or stainless steel.

22. The method for manufacturing a solid electrolytic capacitor according to claim 19, wherein a concentration of the solid particles with respect to the conductive polymer dispersion material is 20 to 60 wt %.

23. The method for manufacturing a solid electrolytic capacitor according to claim 16, wherein the solid particles are made of a metal.

24. The method for manufacturing a solid electrolytic capacitor according to claim 23, wherein the metal oxide is tin oxide or perovskite type oxide.

25. The method for manufacturing a solid electrolytic capacitor according to claim 16, wherein the solid particles are made of a metal oxide.

26. The method for manufacturing a solid electrolytic capacitor according to claim 16, wherein, in the step of forming the outer electrode layer, the step of forming the solid particle containing layer is performed last.

27. The method for manufacturing a solid electrolytic capacitor according to claim 16, wherein, in the step of forming the outer electrode layer, the step of forming the solid particle containing layer is performed first.

28. The method for manufacturing a solid electrolytic capacitor according to claim 16, wherein the step of forming the outer electrode layer consists solely of the step of forming a solid particle containing layer.

* * * * *